US 8,499,152 B1
Jul. 30, 2013

(12) United States Patent
Chen et al.

(54) DATA POSITIONING AND ALERTING SYSTEM

(75) Inventors: Li-Ming Chen, Yonghe (TW); Chin-Ju Lin, Yonghe (TW)

(73) Assignee: Trend Micro, Inc., Tokyo (JP)

( * ) Notice: Subject to any disclaimer, the term of this patent is extended or adjusted under 35 U.S.C. 154(b) by 416 days.

(21) Appl. No.: 12/473,723

(22) Filed: May 28, 2009

(51) Int. Cl.
*H04L 29/06* (2006.01)
*G06F 7/04* (2006.01)

(52) U.S. Cl.
USPC .............................. 713/165; 713/155; 726/2

(58) Field of Classification Search
USPC ................... 726/1, 2; 713/155, 165
See application file for complete search history.

(56) References Cited

U.S. PATENT DOCUMENTS

| | | | | |
|---|---|---|---|---|
| 6,078,649 | A * | 6/2000 | Small et al. | 379/39 |
| 6,122,631 | A * | 9/2000 | Berbec et al. | 1/1 |
| 6,886,019 | B1 * | 4/2005 | Cannon et al. | 1/1 |
| 7,085,736 | B2 * | 8/2006 | Keezer et al. | 705/27.1 |
| 7,454,778 | B2 * | 11/2008 | Pearson et al. | 726/1 |
| 7,614,077 | B2 * | 11/2009 | Brew et al. | 726/1 |
| 7,783,615 | B1 * | 8/2010 | Compton et al. | 707/694 |
| 7,853,986 | B2 * | 12/2010 | Watanabe | 726/2 |
| 2002/0069360 | A1 * | 6/2002 | Thoone et al. | 713/185 |
| 2003/0196114 | A1 * | 10/2003 | Brew et al. | 713/201 |
| 2005/0015713 | A1 * | 1/2005 | Plastina et al. | 715/500.1 |
| 2006/0064420 | A1 * | 3/2006 | Jin | 707/10 |
| 2007/0198462 | A1 * | 8/2007 | Ohta et al. | 707/1 |
| 2007/0220587 | A1 * | 9/2007 | Loyer | 726/1 |
| 2008/0060080 | A1 * | 3/2008 | Lim | 726/26 |
| 2008/0127307 | A1 * | 5/2008 | Fukuta | 726/3 |
| 2008/0155099 | A1 * | 6/2008 | Park | 709/225 |
| 2010/0306152 | A1 * | 12/2010 | Altay et al. | 706/47 |
| 2011/0016143 | A1 * | 1/2011 | Dzeko et al. | 707/769 |
| 2011/0162040 | A1 * | 6/2011 | Stephens | 726/1 |

* cited by examiner

*Primary Examiner* — Mohammad W Reza
(74) *Attorney, Agent, or Firm* — Beyer Law Group LLP

(57) ABSTRACT

A file policy is created for each confidential file in a server computer including a list of events and a corresponding action. The file policies for the confidential files are sent to each client computer in the computer network. A software agent on each client computer detects when an activity occurs that affects one of the confidential files having a file policy. The activity is reported to the server computer and, if the activity matches an event in the policy, the corresponding action is taken. Events include: copying a file, printing, accessing, sending via e-mail, renaming, etc. Actions include: alerting an administrator, temporary blocking the activity or preventing the activity. If the activity is temporarily blocked from occurring, the agent queries the user as to whether the user wishes to request approval, and forwards that requests on to the server computer. If the activity is approved then the software agent removes the temporary block from the user activity and allows the user's activity concerning the confidential file to occur.

31 Claims, 6 Drawing Sheets

Data Positioning System

Data Positioning System

| Event 104 | Action 106 |
|---|---|
| Copy to Removable Device | Alert/Block |
| Print File | Block |
| Access File | Alert |
| E-mail File | |
| Rename File | Prevent |
| FTP Transfer | Prevent |
| Unique File Identifer 108 | |

22

FIG. 2
File Policy

| * File.A // Chronological Record * | |
|---|---|
| ① Accessed by User.A | ←—110 |
| ② User.A copies File.A to Desktop.A | ←—120 |
| [ *Info * ] File.A is on Desktop.A, used by User.A | ←—121 |
| ③ User.A prints File.A on Printer.J | ←—130 |
| ④ User.A mails File.A to User.C | ←—140 |
| ⑤ User.A copies File.A to User.B | ←—150 |
| [ *Info * ] File.A is on Desktop.B, used by User.B | ←—151 |
| ⑥ User.A copies File.A to a removable device | ←—160 |
| [ *Alert * ] An alert is triggered!! | →161 |
| ⑦ User.A'd like to get approval for copying File.A to a removable drive with the reason | ←—170 |
| [ *Audit * ] Get approval from the auditor | →171 |
| [ *Audit * ] Approved & the alert is eliminated | ←—172 |

DATA POSITIONING AND ALERTING SYSTEM

FIELD OF THE INVENTION

The present invention relates generally to data leakage prevention. More specifically, the present invention relates to the tracking and monitoring of computer file activity within a computer network.

BACKGROUND OF THE INVENTION

Information within organizations and entities is often classified as sensitive either for business reasons or for legal reasons. This information may reside within text files, databases, images, pictures, etc. In addition to the potential threat of an unscrupulous party illegally accessing the organization from the outside via an electronic network, and then removing or disrupting the information, there exists the risk of intentional or inadvertent transmission of the sensitive information from inside the organization to the outside. For example, a disgruntled employee might send a sensitive data file to which he or she has access to an outside party via e-mail, thus causing harm to the organization.

In addition to simple business reasons for not wanting sensitive information to be released, i.e., the desire to keep trade secrets secret, many new government regulations mandate controls over information (requiring the sensitive information not to be released outside the company) and companies must comply in view of significant penalties. For example, HIPAA regulates health information, BASEL II regulates financial information, Sarbanes-Oxley regulates corporate governance, and a large number of states have passed data privacy laws requiring organizations to notify consumers if their information is released.

Companies are even subject to a regular information technology audit which they can fail if they do not employ suitable controls and standards.

Technology companies have reacted to this environment with a host of data loss prevention (DLP) products. These products are typically hardware/software platforms that monitor and prevent sensitive information from being leaked outside the company. These DLP products are also known as data leak prevention, information leak prevention, etc. Gateway-based DLP products are typically installed at the company's Internet network connection and analyze outgoing network traffic for unauthorized transmission of sensitive information. These products typically generate a unique signature of the sensitive information when stored within the company, and then look for these signatures as information passes out over the network boundary, searching for the signatures of the sensitive information. Host-based DLP products typically run on end-user workstations within the organization. These products can address internal as well as external release of information and can also control information flow between groups of users within an organization. These products can also monitor electronic mail and instant messaging communications and block them before they are sent.

This prior art technology uses digital signatures, digital fingerprints, regular expressions or even keywords to determine which computer files are important and should be prevented from being leaked from an organization. Although this technology can prevent a user from moving a file outside the organization, it cannot track the usage of the computer file or its current location. Another disadvantage of this prior art technology (based upon signatures and regular expressions, for example) is that it is not effective enough to deal with the intentional or malicious leakage of files from an organization. Furthermore, such technology is completely separate from malware scanning, spam detection and other scanning and filtering techniques. The disadvantage is that a particular suspect file may undergo multiple scans to determine if it is malware, if it is spam, if it is an important file that should not be leaked, etc., thus wasting CPU cycles.

In order to effectively enforce a security policy, a computer network administrator needs to know where computer files and data are flowing and who has used or touched such files and data. Accordingly, a system and technique to meet these needs and address the disadvantages in the prior art is desired.

SUMMARY OF THE INVENTION

To achieve the foregoing, and in accordance with the purpose of the present invention, a data positioning and alerting system is disclosed that tracks the location of confidential files within a computer network, monitors activity concerning those files, alerts an administrator when suspect activities occurs, and blocks risky activities from occurring.

In one embodiment, a computer server that operates as a data repository within a computer network of an enterprise identifies certain computer files as being confidential files that should not be leaked outside the organization. Each file is assigned a unique identifier, given a unique name, marked in a particular fashion, or otherwise identified as being a confidential file. A file policy is created for each file that includes a list of events that might occur concerning the file, and corresponding actions to be taken when an event occurs. A chronological record on the server computer is created for each confidential file that will track the location, usage and alerts generated by activity concerning that file. The file policies for the confidential files are sent to each client computer in the computer network on which it is contemplated that a confidential file may be accessed, used, executed, opened, or otherwise processed. In the event that a file policy changes, the computer server updates the file policy for a confidential file on the server itself, and then sends the updated policy to each of the client computers within the network.

In a second embodiment, a software agent on a client computer receives the file policies from the server computer. The software agent detects when an activity occurs that affects one of the confidential files having a file policy. The activity is reported to the server computer and, if the activity matches an event in the policy, the corresponding action is taken. If the activity is temporarily blocked from occurring, the agent queries the user as to whether the user wishes to request approval, and forwards that requests on to the server computer. If the activity is approved then the software agent removes the temporary block from the user activity and allows the user's activity concerning the confidential file to occur.

Activities that may be monitored by the enterprise and subject to inclusion in a file policy include copying a file, printing, accessing, sending via e-mail, renaming, etc. In general, any activity concerning the file that may result in the file contents of being transmitted outside the organization, disclosed to unauthorized employees, disseminated outside a user's computer, etc., may be monitored.

Advantageously, not only is the present invention able to prevent confidential files from being leaked from an organization, but also is able to pinpoint the location of the files at a current time in a computer network. Furthermore, the present invention can track users who have accessed the confidential file in the past.

BRIEF DESCRIPTION OF THE DRAWINGS

The invention, together with further advantages thereof, may best be understood by reference to the following description taken in conjunction with the accompanying drawings in which:

FIG. 2 illustrates an example file policy for a file.

FIG. 3 illustrates an example of a chronological record for a file A.

DETAILED DESCRIPTION OF THE INVENTION

In one embodiment, the data positioning system (DPS) includes server software running on a computer file server, or data repository, and client software (the DPS agent) running on client machines. In one particular embodiment, the DPS server software runs on a generic server computer and has these functionalities: policy configuration and deployment; DPS agent deployment; storing of chronological records; and auditing and approval-getting broker.

The DPS server software running on the computer server enumerates all confidential or otherwise important files (protected files) located on the computer server and creates a chronological record for each file. Additionally, a policy having a rule or rules for each confidential file is created and stored on the computer server. Once the DPS agent software is installed on the client machines it can receive these policies from the DPS server and can report the location of these confidential files as well as any user activities taken with respect to these files. If a user attempts to move a protected file or take an action identified in the policy for that file, an alert may be triggered. The alert may be triggered by the client machine or upon receipt of the action by the DPS server. If a violation of policy occurs, the DPS server may notify any predefined auditors or managers. If the user wants approval for a particular action, the DPS server sends a ticket to the auditor for approval.

In one embodiment, the details of flow during a violation occur as follows. A user attempts to move a protected file to a portable device. The DPS agent blocks this action immediately (message "unable to write the protected file to the portable device") and sends this violation event back to the DPS server. The DPS agent then provides a message window asking whether the user would like to get approval from a predefined manager. If YES is selected, the DPS agent directs the user to a web page to submit an approval-getting request (to the DPS server) along with a reason. The DPS server receives the request and sends an e-mail notification to the auditor. The auditor accesses the management console of the DPS server and determines whether to approve the request from the user. The DPS server then sends an e-mail notification to the user regarding whether or not the auditor approves the request. The user is now able to move the protected file to a portable device.

DATA POSITIONING ARCHITECTURE

Figure 1:
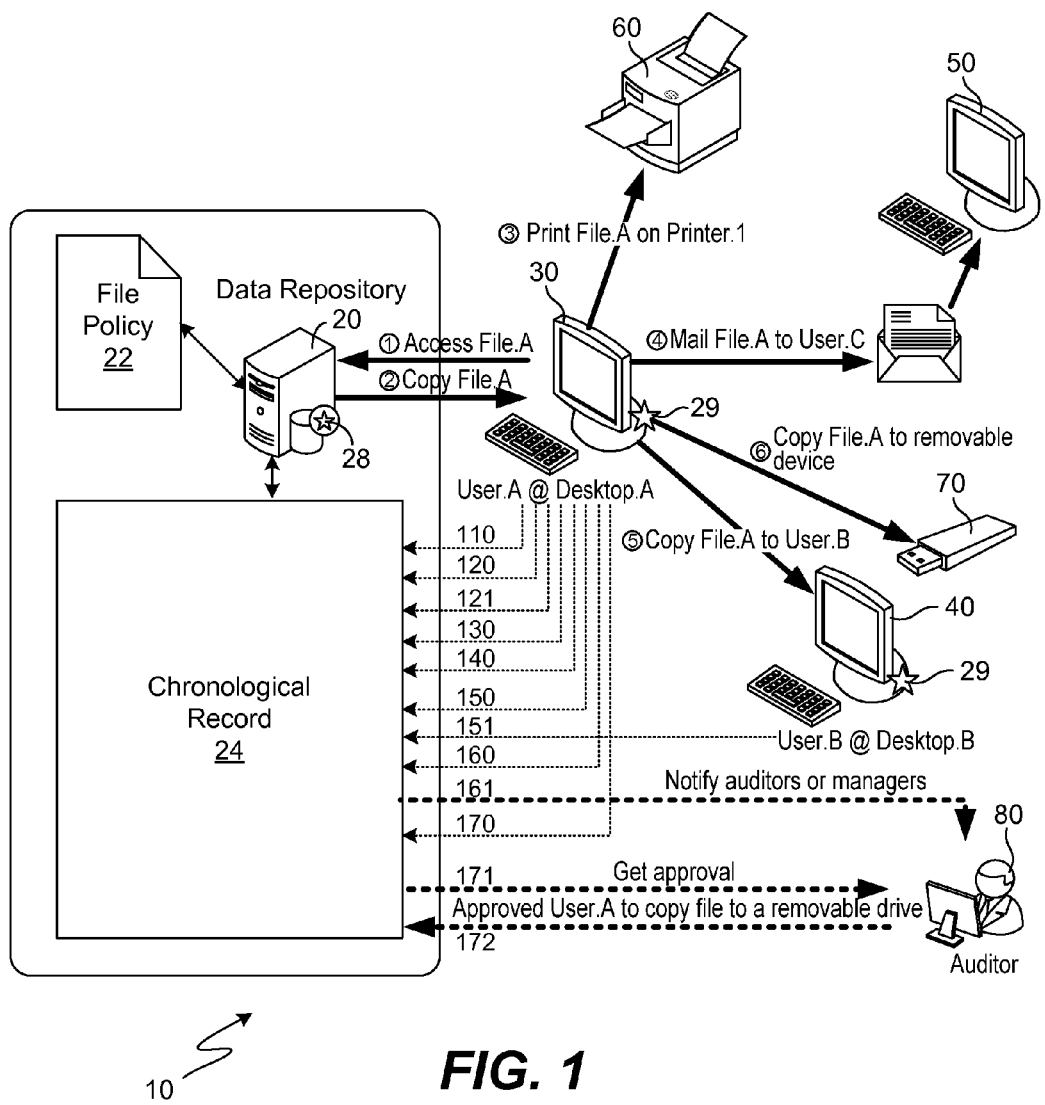
FIG. 1 is a block diagram of a data positioning system according to one embodiment.

FIG. 1 is a block diagram of a data positioning system 10 according to one embodiment. Included within the system is a data repository server computer 20, any number of user desktop or laptop computers 30-50, any number of printing devices 60, and any number of removable devices 70 (such as floppy disk drives, external hard drives, memory sticks, jump drives, USB keys, etc.). Typically, the server computer and the associated user computers and external devices are located within a particular company, enterprise, organization, government entity, etc. that exercises control over the user computers and their activity. For example, the users having access to the user computers rely upon the enterprise for provision of their equipment, for support, for their e-mail accounts, Internet access and access to the necessary files to perform their function. While many times the above equipment will be physically located at a single location, it is contemplated that the desktop computers and/or its equipment may be located remotely and communicate with server computer 20 and the enterprise over a private network, the Internet, a virtual private network, etc. Even a desktop or laptop computer not temporarily in communication with the server computer or other desktop computers may participate in the present invention and be subject to its restrictions as described below.

Also included within the system is an auditor 80. Auditor 80 is preferably an individual using a computer who receives approval requests for computer file activity (as described below) and decide whether or not to grant those requests. Alternatively, a software application running on a computer may automatically respond to approval requests using a predefined set of rules without the need for human intervention. Or, the individual responsible for auditing may perform his or her function without the use of a computer.

Included within the DPS server 20 are any number of file policies 22 defining sets of rules governing how a computer file should be monitored and restricted within the enterprise.

A policy may pertain to a single computer file or may apply to many computer files. A policy defines actions that should be taken to prevent data leakage from an enterprise, such as when a file is printed, sent by e-mail, copied, downloaded to a removable drive, etc. These file policies may be represented and stored in any suitable computer language, application or database such as Microsoft SQL, Access, MySQL, PostgreSQL, or any other structured collection for storing records or data-preferably an application that supports data insertion, deletion and modification.

Also included within the DPS server is a chronological record 24 for each confidential file that the enterprise desires to track. Record 24 is a chronological list of actions that the file is subject to, locations of the file, alerts that an activity generates, requests and approvals for activities, etc. Thus, record 24 may be used by an administrator to trace not only the activities of each file, but also the locations of each file over time. A chronological record may be represented and stored in any suitable computer language, application or database such as Microsoft SQL, Access, MySQL, PostgreSQL, or any other structured collection for storing records or data— preferably an application that supports data insertion, deletion and modification.

Data positioning system 10 executes its tracking and alerting functions through the use of data positioning system (DPS) software, namely, DPS server software 28 running on data repository 20 and DPS client (agent) software 29 running on each desktop computer of the computer network. The functions of each of these software modules will be made clear through discussion of the figures below.

FIG. 2 illustrates an example file policy 22 for a file. As shown, each file policy includes a list of events 104 to which a particular confidential file may be subject, a corresponding action 106 to be taken when an event occurs, and the unique file identifier 108 that identifies the particular file. Events to which a confidential file may be subject, and which are of concern to an enterprise concerned about leakage of the confidential file outside the enterprise, include: copying a file to a removable device such as an external hard disk, USB drive, floppy disk, tape drive, CD-ROM or similar device that is easily removed from a computer; printing a file on a printer, plotter, or similar device; accessing the file on the data repository from a user computer; copying the file from one computer to another; adding the file as an attachment to an e-mail message; renaming the file; inserting the file into another file; transferring the file to another computer using FTP or similar transfer protocol; etc. Other events include transferring the file via an instant message and sharing the file via P2P software. All possible channels used to transfer the file to an external network are monitored.

Corresponding to each possible event 104 is an action 106 that will be taken by the DPS software when the particular event occurs. Actions that may be taken include: generating an alert that notifies the DPS server, administrator or auditor that a particular event has occurred; blocking an activity from happening, but allowing the user to request approval for the activity; preventing an activity from occurring with no option for requesting approval; or, no action at all. In one embodiment, a policy need only list particular events to which an action must be taken; run-of-the-mill events that do not present a data leakage risk (such as a file being moved from one folder to another on the user computer) need not be listed in a policy. By default, run-of-the-mill events not within a policy will generate no action, and will not result in a notation being made in the chronological record. Alternatively, a run-of-the-mill event may be listed within a policy, thus causing a notation to be made, but the action field may be left blank.

Also associated with each policy is a unique file identifier 108 that identifies the particular file to which the policy pertains. Of course, any number of file identifiers may be listed with each policy, thus causing the policy to be applied to each file. The file identifier is preferably an identifier unique within the data repository of the enterprise that prevents file collisions. For example, the identifier may be a hash value, a message digest, a random number, etc. Or, the data repository may simply enforce a file naming convention that guarantees that each file name is unique. The computer network then prevents files from being renamed on user computers through the use of operating system preferences, software hooks or the DPS agent itself. If a unique identifier is chosen that is other than the file name, this unique identifier may be inserted into a particular location within the file, added to the file properties or other file metadata, or incorporated into the file name itself. In any case, the convention used is known both to the DPS server and the DPS agents so that files may be identified during execution of the invention.

In one specific embodiment, the following occurs when a policy is added. First, the system or user browses the local or remote directories and selects the files to be protected. As the files are selected, the DPS server uses the CRC-32 (Cyclic Redundancy Check) algorithm to generate a "fingerprint" (i.e., a unique file identifier) for each protected file. The user then defines the policy applicable to the protected files, e.g., prohibit copying the file to a removable device. Next, the user defines the action applicable to any attempted violation, e.g. block the attempted violation. The CRC values are stored in the applicable policy.

Once any change (addition, deletion or modification) is made to the policy, the DPS server notifies the DPS agents to apply the whole set of policies, including the changes. The DPS agent uses the Trend Micro, Inc. VSAPI (Virus Scan API) to generate the file CRC value for each file under analysis and compares that with the CRCs defined in the policies as the files are accessed on the desktop computer. The agent monitors if the I/O functions "OpenRead" or "OpenWrite" are called. If the generated CRC matches with any one defined in the policies, the DPS agent will monitor the activity directed toward the protected file.

FIG. 3 illustrates an example of a chronological record for a file A. As shown, the record lists activities to which the file is subject, where the file is located, any alerts that are generated, requests for approval and decisions on those requests. As described below, inputs to this record are received from each desktop computer, the DPS server 28, and the auditor 80. A system administrator may access this chronological record at any time to determine file activities, which user has been using the file, or where the file is located.

DATA POSITIONING FLOW DIAGRAMS

Figure 4:
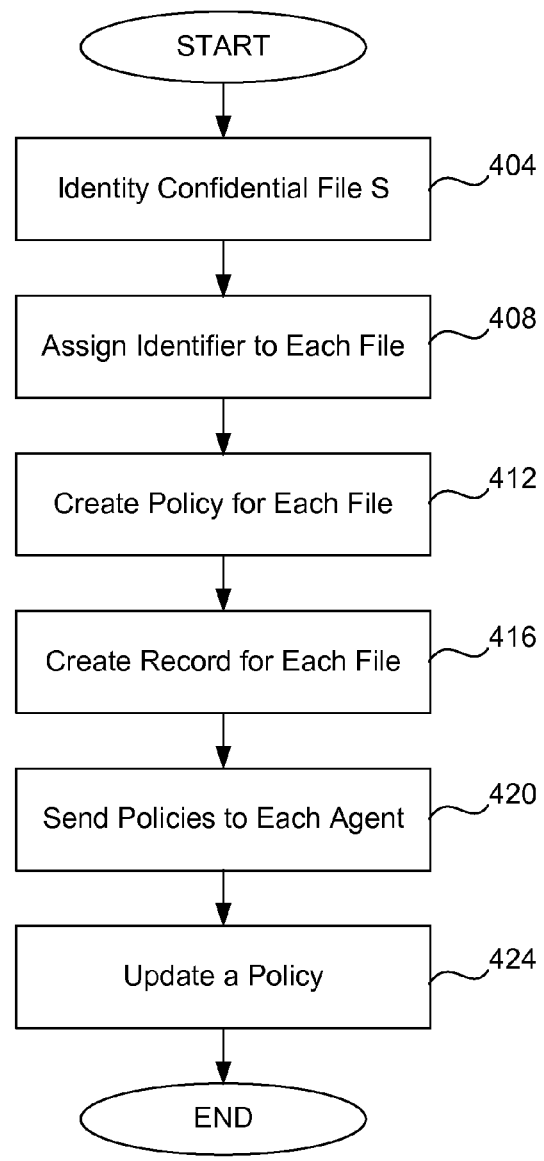
FIG. 4 is a flow diagram describing how the DPS software, policies and records are initially set up to permit execution of the present invention.

FIG. 4 is a flow diagram describing how the DPS software, policies and records are initially set up to permit execution of the present invention. In step 404 an administrator of the enterprise determines which computer files of DPS server 20 are confidential files that, for whatever reason, should not be leaked outside the enterprise, should not be shared outside of a select group of employees, should not be printed, should not be copied, etc. These confidential files may also be located on other computers within the enterprise, not necessarily on the DPS server. Or, an administrator may decide that a file is a confidential file for purposes of tracking its location, knowing where resides and which users are accessing the file. A confidential file may be a text file, a spreadsheet, an image file, a video file, a data file, database, or any digital computer file. The administrator may choose to identify all files on the computer (any computer the administrator has access to) as confidential files or may choose a select number of files for whatever reason. In step 408 a unique identifier is established for each confidential file according to the convention established above, and this unique identifier is associated with a file according to the particular convention used, or may be associated as described above.

In step 412 a policy is created for each confidential file. As shown in example of FIG. 2, each policy includes a number of events and corresponding actions. A highly sensitive file may have a policy that prevents a user from printing it, e-mailing it or downloading it, while a file that is not very sensitive may simply have a policy that records each event but no action is taken. Typically, a system administrator would create a policy for each confidential file and save these policies within a database of the data repository. A given policy may apply to any number of files by listing the file identifiers in association with the policy. Next, in step 416 a blank chronological record is created for each confidential file and these records are also stored within a database of the data repository. Each blank record serves as a placeholder into which activities will be recorded as the file is accessed, read, copied, etc. The chronological record for each file may be seeded with initial information such as the name of the file, its unique identifier, its creation date, where it was created, who created it, its initial location, any reason for its confidentiality, etc. Each record also includes access restrictions such as who has privilege to access the file, print the file, send the file, etc. Each record also includes who can authorize the access request and who should be alerted if there is any unauthorized access.

Next, in step 420 the individual file policies are sent to each DPS agent 29 on each user computer to be stored with the DPS agent itself or with an associated database. Having each file policy present on each user computer allows the user computer to analyze particular file activities and respond quickly. Alternatively, the DPS server may send a list of all of the confidential files to each DPS agent so each DPS agent is aware of which confidential files must be monitored for activity. Once completed, each DPS agent may begin monitoring its host computer for confidential file activity. As an optional step, in step 424 it may be necessary for the DPS server to update particular file policies on the DPS agents. As in step 412, an administrator creates a new or updated policy for a particular file and then directs the DPS server to send that new file policy to all of the DPS agents. Each agent then overwrites its current file policy with the new file policy.

Figure 5:
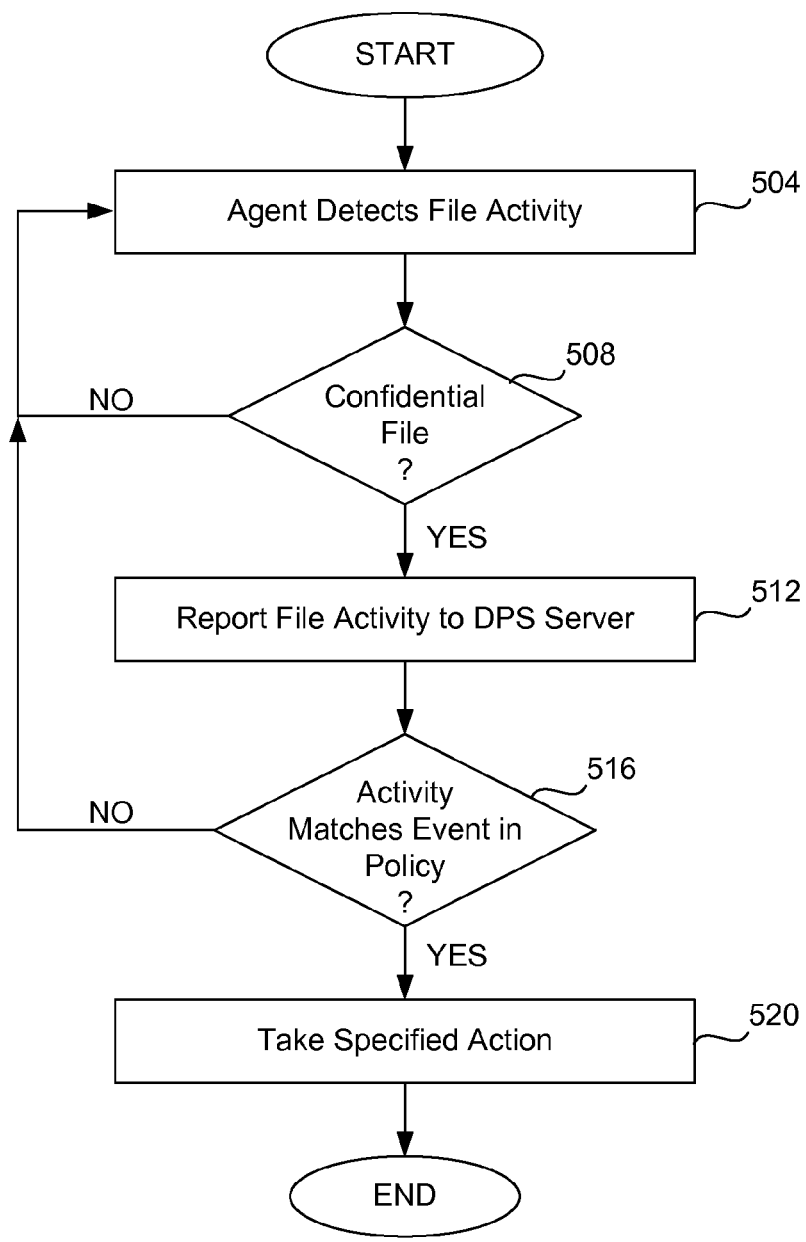
FIG. 5 is a flow diagram describing one embodiment by which a DPS agent detects file activity and monitors a file or takes action as necessary.

FIG. 5 is a flow diagram describing one embodiment by which a DPS agent detects file activity and monitors a file or takes action as necessary. It will be appreciated by one of skill in the art that the below steps may be performed in a different order for efficiency. For example, reporting file activity may occur after a check for a matching event. In step 504 a DPS agent on a user computer detects activity for a particular file desired by user. For example, the user may be attempting to access a file in the data repository, to print a file, to attach a file to an e-mail message, to copy a file, to open a file, to write a file, to download a file, etc. In one embodiment, the DPS agent detects such file activity by monitoring API calls in the operating system of the host computer. For example, a user attempt to open a file, close a file, print a file or copy a file result in a particular API call that a DPS agent may monitor. In addition, the DPS agent may use a software hook, known to those of skill in the art, to insert its own custom code into an operating system API call in order to perform its own functions before the user-desired activity is completed.

The DPS agent monitors API calls or inserts software hooks to prevent a particular activity from occurring before approval is granted. Each activity (such as file open, file close, file copy, rename file, print file, access file, e-mail a file, FTP transfer, etc.) can be detected and blocked if necessary by the DPS agent. In one embodiment, the way the DPS agent monitors API calls is similar to how it works in any scan engine, such as the scan engine from Trend Micro, Inc. In particular, the API calls provided by operating systems are leveraged by vendor software. Those API calls notify the DPS agent whenever a file is touched (such as during read, write and copy).

Once the DPS agent detects desired activity for a particular file, in step 508 the agent then determines if the file is a confidential file that the enterprise wishes to be monitored. If the unique file identifier is simply the name of the file, one technique is to compare the name of the file in question with the unique file identifiers 108 of all of the file policies stored with the DPS agent. If the unique file identifier is other than the name of the file (such as the CRC), then the DPS agent extracts the unique file identifier from the file in question-using the convention that has been established for the location of the unique file identifier-and compares this extracted file identifier with all of the unique file identifiers 108.

If it is determined that the file in question is not a confidential file that the enterprise wishes to be monitored, then the desired file activity is allowed to occur and control returns to step 504 where the agent continues to monitor other files for activity. If it is a confidential file, then in step 512 the desired file activity is reported to the DPS server by the DPS agent and is stored as an entry in the chronological record. The default is that all activities of confidential files will be reported to the DPS server even if the desired activity does not match an event in the policy. In addition, the file policy for the confidential file in question will be retrieved from the local database for use by the DPS agent.

Next, in step 516 the desired activity is compared to each event in the file policy to determine if there is a match. For example, if the user desires to rename a file the custom code of the agent attempts to match this activity (e.g., the word "rename") with the event list 104 and, in example of FIG. 2, a match would be found in the fifth entry. If the desired activity does not match any event then no further action is taken and the desired file activity is allowed to occur. For example, the custom code of the agent which has hooked a particular API call allows the call to proceed normally. On the other hand, if the desired activity does match a particular event, then in step 520 the action of the file policy corresponding to the matched event is taken. In one embodiment, the custom code of the agent executes this action before allowing the API call to proceed.

A variety of actions may be taken by the DPS agents when an event is matched. If no action is specified, then nothing is done and the API call is allowed to conclude normally. If the action is "alert" then a special alert message is sent to the DPS server, is recorded in the chronological record and may be sent to the auditor 80, a manager, or other person or computer. The entity in receipt of the alert and then take any action it desires. If the action includes "prevent" then the agent immediately terminates the API call, the desired activity will not occur and control returns to step 504.

Figure 6:
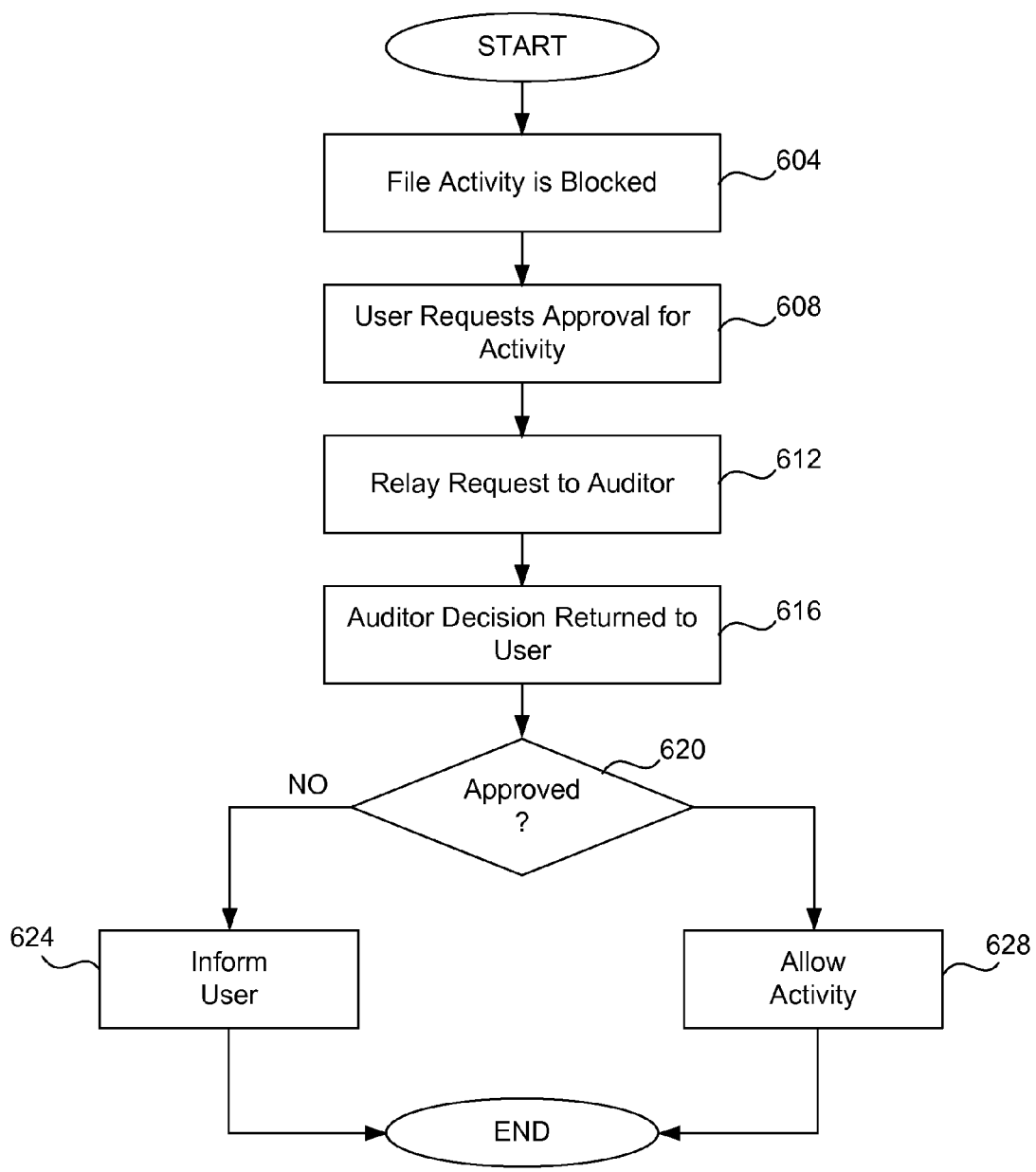
FIG. 6 is a flow diagram describing an embodiment in which a file activity is blocked and the user seeks permission.

FIG. 6 is a flow diagram describing an embodiment in which a file activity is blocked and the user seeks permission. If the action includes a "block" then in step 604 the DPS agent temporarily blocks the desired activity from occurring (e.g., by interrupting and suspending the API call), and provides the user with the option of seeking approval for the activity. For example, the DPS agent presents a window informing the user that the activity is temporarily blocked and asking if the user would like to 1) cancel the desired activity or 2) seek permission from the auditor. Examples of information presented in windows presented to the user include: "Activity blocked: It is restricted to move the file "<file_name>" to a portable device according to company policy;" and "Block and Approval Request: It is restricted to move the file "<file_name>" to a portable device according to company policy, would you like to request approval from the auditor?" There is also a bypass option in which the DPS agent reports the file activity to the DPS server silently without providing any message to user when the violation is detected.

If the choice is "cancel" then the DPS agent terminates the API call to perform the desired activity and control returns to step 504. If the choice is "seek permission" then in step 608 the DPS agent sends a special message to the DPS server (which is also recorded in the record) indicating: the user name, user location, user computer identifier, unique file identifier, desired file activity, any request for approval. The DPS server then forwards this request in step 612 on to the auditor. The auditor reviews the request and decides yes or no. Alternatively, an automated software program may rule on these requests by automatically deciding yes or no based upon various criteria. For example, certain users may always have their requests approved or denied. Certain types of file activity may always be approved or denied. Particular files may always be denied approval if they are particularly sensitive. Other criteria may also serve as the basis for automated decision-making by a software program. The decision is sent from the auditor via the DPS server back to the DPS agent in step 616. If approved in step 620, then the DPS agent allows the API call to continue normally in step 628 and the activity will occur. If not approved, then the agent terminates the API call, the activity does not occur and the user is informed 624. In either case, the user may be presented with a screen explaining the decision of the auditor.

DATA POSITIONING EXAMPLE

FIGS. 1 and 3 will now be discussed again in the context of the specific example they present. It is assumed that file A is a confidential file and that the file policy for file A has one event "Copy to removable device," and that the corresponding action is "Alert/Block." Of course, more complex policies (such as the policy shown in FIG. 2) are possible. Each of the below activities 1-5 will be recorded in the chronological record for file A, but, since these activities do not match the single event, no action is taken.

In activity 1 computer 30 accesses file A stored in the data repository. This activity results in message 110 being sent to the chronological record 24 for file A and the corresponding entry indicating that the user of this computer has accessed the file. In activity 2 the file is copied to the user computer and message 120 is sent to the chronological record resulting in the entry indicating that the user has copied the file to his or her desktop computer. Accordingly, the DPS agent 29 sends a message 121 to the record indicating the current location of the file and who is using it. In activity 3 the user prints the file on printer 60. Accordingly, message 130 is sent and the record reflects that the user has printed the file on printer #1. In activity 4 the user attaches the file to an e-mail message and sends a message to another user at computer 50. Message 140 is then sent and the record reflects that the user has mailed file A to user C. In activity 5 user copies the file to another user at computer 40. Message 150 is sent and the record reflects that the user has copied file A to user B. Accordingly, the DPS agent on computer 40 sends message 151 indicating that file A is now on computer 40 and is in use by user B.

In activity 6 the user of computer 30 attempts to copy file A to the USB key 70. The agent sends a message 160 to record this activity in the record. Because this file is a confidential file, the activity "copy to removable device" is compared to the events in the file policy for file A. There is a match, and the action dictates that an alert be sent 161 to auditor 80 as well as to a system administrator or other destination. Because the action also includes a "block" the DPS agent on computer 30 prevents the file from being copied to device 70. The user is presented with a choice, and elects to seek permission, thus message 170 is sent from the user computer to the record. The message includes a user identifier, an identification of the desired activity, an identifier for the file, the type of the device, and a request for approval. Accordingly, the DPS server relays requests 171 to the auditor 80. The auditor approves this request and sends a message 172 to be recorded in the chronological record and also to be forwarded to the DPS agent of computer 30. Once the agent receives this approval, it then allows the copying of file A to the removable device 70 to occur.

COMPUTER SYSTEM EMBODIMENT

Figure 7A:
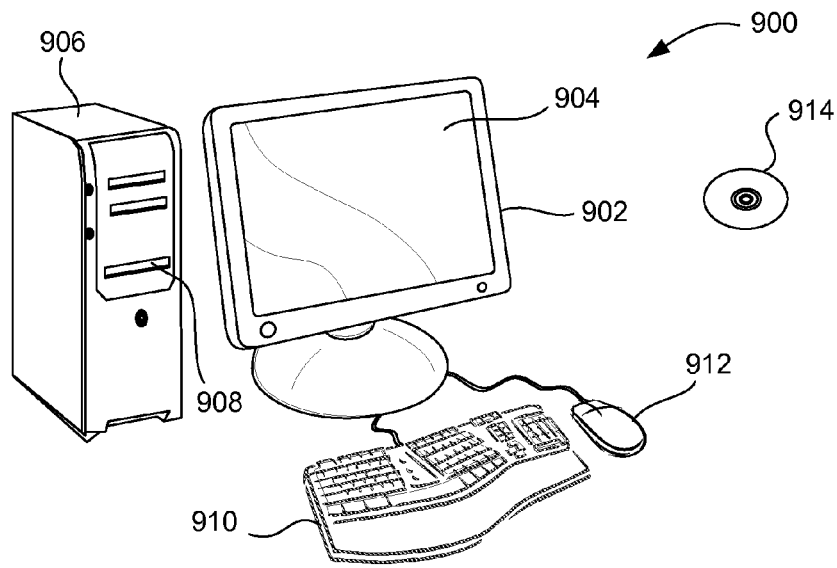
FIGS. 7A and 7B illustrate a computer system suitable for implementing embodiments of the present invention.
Figure 7B:
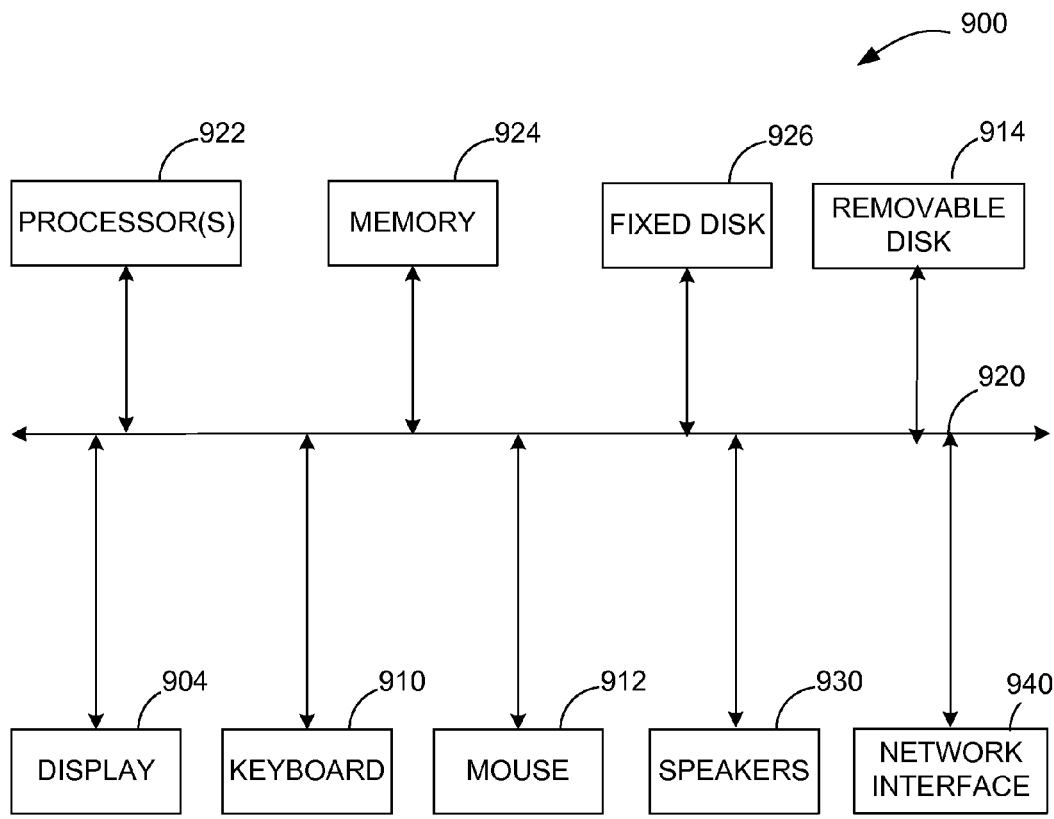

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of tracking confidential files within a computer network, said method comprising:
   receiving at a client computer in said computer network from a server computer a file policy for a confidential computer file, said file policy including at least one event, a corresponding action, and one or more unique file identifiers, one of said unique file identifiers uniquely identifying said confidential computer file;
   detecting by said client computer a user-initiated activity on said client computer that affects a client computer file;
   determining that said client computer file is said confidential computer file by comparing a unique identifier of the client computer file to one or more of said unique file identifiers stored in the file policy;
   determining a location of said confidential computer file based upon said comparing;
   sending from said client computer to said server computer the location of said confidential computer file within said computer network; and
   sending from said client computer to said server computer an indication of said user-initiated activity.

2. A method as recited in claim 1 further comprising:
   determining that said user-initiated activity matches said event of said file policy;
   executing said action of said file policy; and
   sending from said client computer to said server computer an indication of said executed action.

3. A method as recited in claim 1 wherein said action prevents execution of said user-initiated activity on said client computer.

4. The method as recited in claim 1 wherein said event is a user-initiated activity of said client computer.

5. The method as recited in claim 1 further comprising:
   performing said step of detecting by using a software hook module that hooks an operating system command of said client computer.

6. The method as recited in claim 1 further comprising:
   receiving a plurality of file policies at said client computer, each of said file policies corresponding to at least one of a plurality of confidential files in said computer network and each of said file policies including at least one identifier of said confidential files.

7. The method of claim 1, further comprising:
   recording the user-initiated activity in a chronological record unique to said client computer file.

8. The method of claim 7, wherein the chronological record is also unique to said file policy.

9. The method of claim 1, further comprising:
   storing one or more unique identifiers in the file policy.

10. The method of claim 1, further comprising:
    prompting a user whether or not to request approval to access the confidential computer file; and
    receiving from said user an indication to seek approval to access the confidential computer file.

11. The method of claim 1, further comprising:
    sending a request from said client computer to said server computer to allow said user-initiated activity that affects said client computer file to occur on said client computer;
    receiving an approval from said server computer to allow said user-initiated activity; and
    allowing said user-initiated activity to occur on said client computer.

12. A method of monitoring confidential file usage within a computer network, said method comprising:
    receiving at a client computer in said computer network from a server computer a file policy for a confidential computer file, said file policy including at least one event, a corresponding action, and a unique file identifier uniquely identifying said confidential computer file;
    detecting by said client computer a user-initiated activity on said client computer that affects a client computer file;
    determining that said client computer file is said confidential computer file by comparing a unique identifier of the client computer file to said unique file identifier stored in the file policy;
    determining that said user-initiated activity matches said event of said file policy;
    executing said action of said file policy by temporarily blocking said user-initiated activity from occurring on said client computer;
    sending a request from said client computer to said server computer to allow said user-initiated activity that affects said client computer file to occur on said client computer;
    receiving an approval from said server computer to allow said user-initiated activity; and
    allowing said user-initiated activity that affects said client computer file to occur on said client computer.

13. The method as recited in claim 12 further comprising:
    sending from said client computer to said server computer the location of said client computer file within said computer network.

14. The method as recited in claim 12 further comprising:
    prompting a user of said client computer whether or not to request approval for said user-initiated activity; and
    receiving from said user an indication to seek approval for said user-initiated activity.

15. The method as recited in claim 12 wherein said event is a user-initiated activity of said client computer.

16. The method as recited in claim 12 further comprising:
    performing said step of detecting by using a software hook module that hooks an operating system command of said client computer.

17. The method as recited in claim 12 further comprising:
    performing said step of determining that said client computer file is said confidential computer file by comparing an identifier of said client computer file with an identifier of said file policy.

18. The method of claim 12, wherein said chronological record is stored on said server computer.

19. The method of claim 12, wherein said chronological record is also unique to said file policy.

20. The method of claim 12, further comprising:
    sending from said client computer to said server the location of said confidential computer file based upon said step of determining that said client computer file is said confidential computer file.

21. The method of claim 12, further comprising:
recording the user-initiated activity in a chronological record unique to said client computer file.

22. The method of claim 21, wherein the chronological record is also unique to said file policy.

23. A method of tracking confidential files within a computer network, said method comprising:
sending from a server computer in said computer network to a plurality of client computers a file policy for a confidential computer file, said file policy including at least one event, a corresponding action and a unique identifier corresponding to the confidential computer file;
receiving from one of said client computers an indication that a user-initiated activity has occurred on said one client computer that affects said confidential computer file;
determining that said user-initiated activity occurring on said one client computer affects said confidential computer file by matching said unique identifier of said file policy with a unique identifier of a client computer file on said one client computer;
recording said user-initiated activity, an indication of said one client computer, and an indication of said confidential computer file in a database record of said server computer; and
receiving from said one client computer an indication that said user-initiated activity matches said event of said file policy and a notification alert corresponding to said action alerting said server computer that said event has been attempted by said one client computer.

24. The method as recited in claim 23, wherein said notification alert alerts said server computer that said user-initiated activity has been temporarily blocked on said one client computer, said method further comprising:
receiving a request from said one client computer to allow said user-initiated activity to occur on said one client computer; and
sending an approval to said one client computer to allow said user-initiated activity to occur on said one client computer.

25. The method as recited in claim 23, wherein said notification alert alerts said server computer that said user-initiated activity has been permanently blocked on said one client computer.

26. The method as recited in claim 23 further comprising:
sending from said server computer to said client computers a plurality of file policies, each of said file policies corresponding to at least one of a plurality of confidential files in said computer network.

27. The method as recited in claim 23 further comprising:
receiving from said one client computer a plurality of indications that user-initiated activity has occurred on said one client computer that affects said confidential computer file, each of said indications reflecting a discrete user-initiated activity affecting said confidential computer file, wherein said indications are recorded chronologically in said database record of said server computer.

28. The method as recited in claim 23 further comprising:
reviewing a plurality of computer files on said computer server;
identifying a subset of said computer files as confidential computer files; and
marking said confidential computer files as being confidential in a way that differentiates said confidential computer files from computer files that are not identified as being confidential.

29. The method of claim 23, further comprising:
recording the user-initiated activity in a chronological record unique to said client computer file.

30. The method of claim 29, wherein the chronological record is also unique to said file policy.

31. The method as recited in claim 23 further comprising:
receiving from one client computer an indication that said confidential computer file is located upon said client computer.

* * * * *

UNITED STATES PATENT AND TRADEMARK OFFICE
CERTIFICATE OF CORRECTION

PATENT NO. : 8,499,152 B1  
APPLICATION NO. : 12/473723  
DATED : July 30, 2013  
INVENTOR(S) : Chen et al.

Page 1 of 1

It is certified that error appears in the above-identified patent and that said Letters Patent is hereby corrected as shown below:

In the Claims:

Column 11, Line 35 (claim 2)     change "A" to --The--  
Column 11, Line 38 (claim 2)     change "file policy;" to --"file policy on said client computer;"--  
Column 11, Line 41 (claim 3)     change "A" to --The--  
Column 14, Line 34 (claim 31)     change "method as recited in claim" to --method of claim--  
Column 14, Line 35 (claim 31)     change "from one client" to --from said one client--

Signed and Sealed this  
Eighth Day of October, 2013

Teresa Stanek Rea  
*Deputy Director of the United States Patent and Trademark Office*